UNITED STATES PATENT OFFICE.

FRIEDRICH RUNKEL, OF ELBERFELD, GERMANY, ASSIGNOR TO THE FARBENFABRIKEN, VORMALS FR. BAYER & CO., OF SAME PLACE.

RED AZO DYE.

SPECIFICATION forming part of Letters Patent No. 561,615, dated June 9, 1896.

Application filed February 26, 1896. Serial No. 580,861. (Specimens.) Patented in Germany March 31, 1893, No. 81,152; in England October 1, 1894, No. 18,578, and in France November 13, 1894, No. 203,744.

*To all whom it may concern:*

Be it known that I, FRIEDRICH RUNKEL, doctor of philosophy, chemist, assignor to the FARBENFABRIKEN, VORMALS FR. BAYER & Co., of Elberfeld, Prussia, Germany, residing at the same place, a subject of the Emperor of Germany, have invented a new and useful Improvement in the Manufacture of Red Azo Dye, (for which the aforesaid FARBENFABRIKEN, VORMALS FR. BAYER & CO., have already obtained Letters Patent in Germany, No. 81,152, dated March 31, 1893; in England, No. 18,578, dated October 1, 1894, and in France, No. 203,744, dated November 13, 1894;) and I do hereby declare the following to be an exact and clear description of my invention.

My invention relates to the production of a new red azo dye which results from the combination of one molecular proportion of the diazo derivative of ethyl paramidobenzoate with one molecular proportion of the dioxynaphthalene monosulfo-acid (OH:SO$_3$H:OH = 1.4.8) described in the Letters Patent No. 444,679, dated January 13, 1891.

In carrying out my process practically I proceed as follows: 16.5 parts, by weight, of ethyl paramidobenzoate are mixed with ice-water, and twenty-four parts, by weight, of hydrochloric acid (23° Baumé) are added. At a temperature of about 10° centigrade the above ethyl paramidobenzoate is converted into its diazo compound by gradually adding seven parts, by weight, of sodium nitrite dissolved in a small quantity of water. The resulting diazo-compound solution is allowed to run in an aqueous solution prepared by dissolving twenty-seven parts, by weight, of the sodium salt of the aforesaid dihydroxynaphthalene sulfo-acid in five hundred parts, by weight, of water, with the addition of thirty-five parts, by weight, of sodium acetate. The now almost instantly formed azo coloring-matter separates for the most part, and if any part of the formed dye remains dissolved it might be salted out with common salt in the well-known manner. After some time the coloring-matter is filtered off, pressed, and dried. The dyestuff corresponds with the following formula:

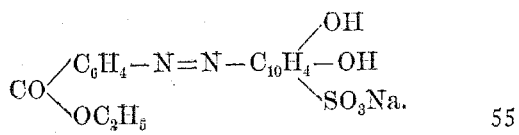

It forms in dry state a brown powder with a green luster, which is soluble in cold water with difficulty, easily soluble in hot water with a splendid red color, and likewise soluble in cold and hot alcohol with a red color. By concentrated sulfuric acid the product is dissolved with a bluish-black color, red flakes being precipitated on the addition of a large quantity of ice-water to the above sulfuric-acid solution.

The new coloring-matter dyes wool in acid-baths in bluish-red shades excellent for their purity and for their great resistance to the action of alkali.

Having now described my invention and in what manner the same may be performed, what I claim as new, and desire to secure by Letters Patent, is—

1. The process for the production of a new red azo coloring-matter, which consists in combining molecular proportions of diazotized ethyl paramidobenzoate and of the herein-described dihydroxynaphthalene sulfo-acid, substantially as described.

2. As new article of manufacture the azo dyestuff having the formula:

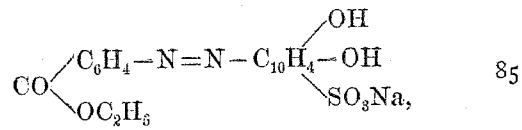

producible by combining molecular proportions of diazotized ethyl paramidobenzoate with the herein-described dihydroxynaphthalene sulfo-acid which dye forms in dry state a brown powder with a green luster, easily soluble in hot water and alcohol with a splendid red color, soluble in concentrated sulfuric acid (66° Baumé) with a bluish-black color, red flakes being precipitated after the addition of a large quantity of ice-water to the strong sulfuric-acid solution, producing on wool clear red shades, excellent for their brilliancy and fastness against the action of alkali.

In testimony whereof I have signed my name in the presence of two subscribing witnesses.

FRIEDRICH RUNKEL.

Witnesses:
OTTO KÖNIG,
L. ROVIG.